April 4, 1961  A. E. DEELEY-JONES  2,977,700
LICENSE PLATE INSTALLATION
Filed Sept. 11, 1957  2 Sheets-Sheet 1

INVENTOR
ARNOLD E.
DEELEY-JONES

ATTORNEY

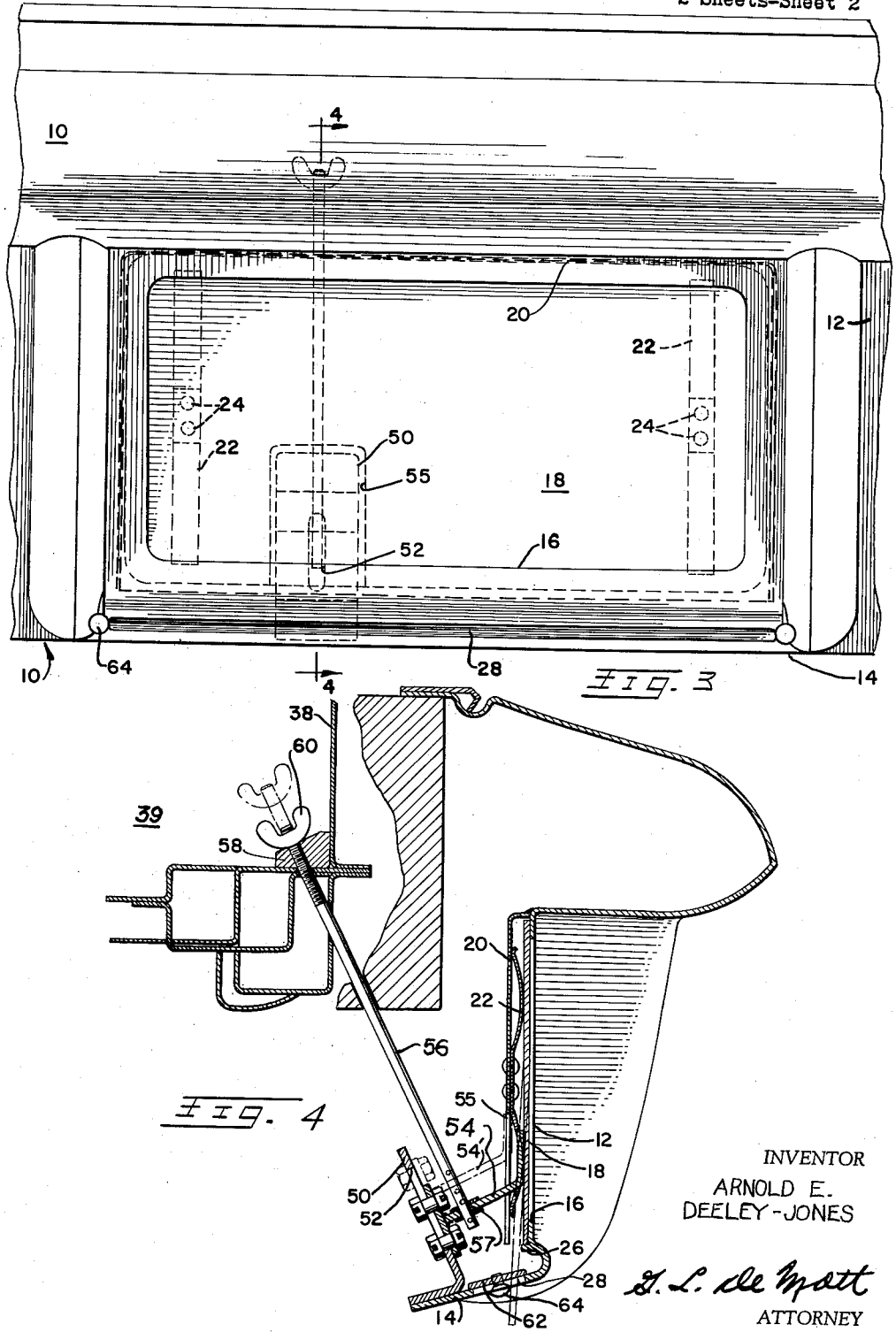

United States Patent Office 2,977,700
Patented Apr. 4, 1961

2,977,700

LICENSE PLATE INSTALLATION

Arnold E. Deeley-Jones, Detroit, Mich., assignor to General Motors Corporation, Detroit, Mich., a corporation of Delaware Filed Sept. 11, 1957, Ser. No. 683,384

6 Claims. (Cl. 40—202)

My invention relates generally to license plate holders and more particularly to means for securing license plates within their holders.

With conventional license plate holders license plates require tools for removal and even with the use of tools the plates are difficult to remove due to rusting or corroding of the fasteners that are exposed to the weather.

Accordingly, the principal objects of this invention are to provide a license plate holder that permits rapid exchange of license plates without the use of tools; eliminate fasteners that are exposed to weather; prevent unauthorized removal of the plates; and at the same time provide an attractive mounting for the plates and conceal dangerous sharp edges of the plates.

The above and other objects and advantages of this invention will be made more apparent from the following description when read in connection with the accompanying drawings wherein like reference numerals refer to like parts, and wherein:

Figure 3 is an elevation view of a second embodiment of a license plate installation in accordance with the present invention; and Figure 4 is a sectional view on line 4—4 of Figure 3.

Figure 1:
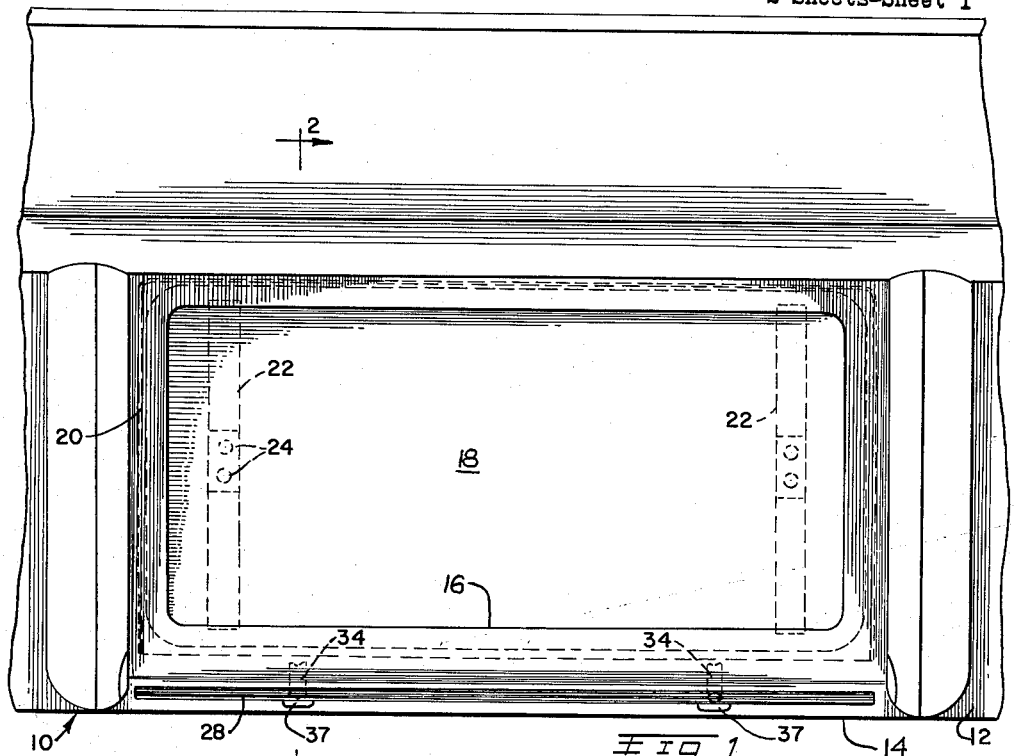
Figure 1 is an elevation view of a bumper and license plate installation embodying the present invention.

In Figures 1 through 4 reference character 10 designates a bumper which is comprised of an upwardly extending wall 12 and a horizontally extending wall 14. The wall 12 is provided with a first aperture 16 behind which a license plate 18 is positioned. A housing 20 is secured to the bumper behind the aperture 16 and carries leaf springs 22 or other resilient devices which are secured to the housing by rivets 24. The springs 22 contact the license plate 18 when it is in position behind the aperture 16, and are adapted to hold the license plate against the rear side of the wall 12. A flange 26 is provided on the bumper 10 and is horizontally disposed beneath the aperture 16 to support the license plate 18. The horizontally extending wall 14 has a second aperture or slot 28 extending for at least the full length of the license plate to permit the insertion and removal of the plate.

Figure 2:
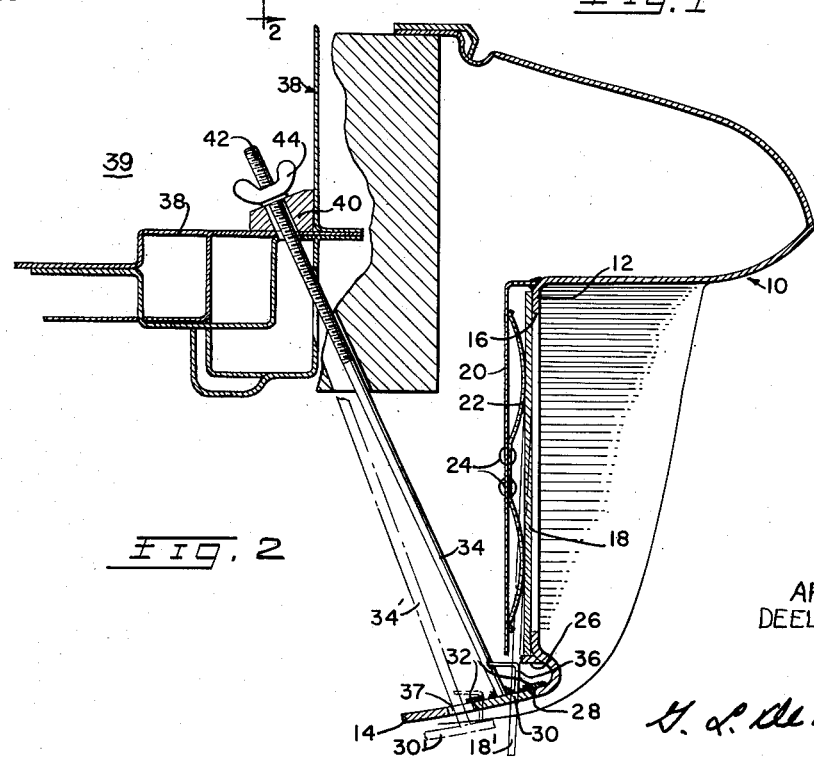
Figure 2 is a sectional view taken on the line 2—2 of Figure 1.

In the first embodiment of my invention as shown in Figures 1 and 2, a cover plate 30 or similar blocking means is provided to fit within the slot 28. Strips 32 extend along either side of the slot 28 to provide a support for the cover plate 30. Two studs 34 each have one end fixed to the cover plate, and tabs 36 are provided at the juncture of studs 34 with plate 30 to provide strengthening means. Notches 37 are provided to the rear of the slot 28 adjacent each of the studs 34 to receive the studs, as indicated at 34', when the cover plate 30 is swung into open position as shown in dotted lines at 30'. The studs 34 extend through the framework 38 of the vehicle trunk 39 and through a spacer 40. The spacer 40 is preferably made of brass or some other rust or corrosion resistant material. The upper end of each stud is provided with a threaded portion 42 adapted to receive a wingnut 44.

Thus, it may be seen that the license plate 18 may be inserted or removed through the slot 28 as shown in dotted lines at 18'. The leaf springs 24 engage the plate and in cooperation with the flange 26 hold the license plate 18 in position. When the cover plate 30 is placed in the slot 28 and the stud 34 is tightly secured with wingnut 44, it is not possible to remove the license plate without having access to the interior of the vehicle trunk. The wingnut is readily operated without the use of tools and is protected from the weather to prevent rust.

The second embodiment of my invention shown in Figures 3 and 4 is generally similar to that of Figure 1, but it includes an angle bracket 50 secured to the upper face of the horizontally extending wall 14, and has a slot 52 therein for slidably carrying a blocking means, or clamping plate 54. The plate 54 is adapted to extend through a rectangular opening 55 in the housing 20 and bears against the rear face of the license plate 18 to lock the license plate into position. Clamping plate 54 is slidable to an unlocked position 54' shown in dotted lines. A stud 56 is journalled in the plate 54 by any suitable means as shown at 57. The upper portion of the stud extends through the framework 38 of the trunk 39 and threadedly engages a spacer 58 mounted in the trunk. A wingnut 60 is secured to the top of stud 56 to facilitate manual rotation of the stud. If desired the slot 28 may be covered by a plate 62 either inside or outside the bumper, and may be fastened thereto by any suitable means such as screws 64 at either end of the cover plate 62.

In the operation of the second embodiment it is clear that when the plate 62 is removed and the clamping plate 54 is in its raised position, the license plate 18 may be inserted or removed through the slot 28 as in the first embodiment. However, the lowering of the plate 54 into locked position by manual rotation of the stud 56 causes engagement of the clamp with the license plate 18 to secure the plate in position and prevents its removal by those not having access to the interior of the vehicle trunk 39.

Although the present invention is described in combination with a vehicle bumper, it is to be understood that it may be practiced in a license plate holder independent of a bumper.

What I claim is:

1. A license plate holder for motor vehicles and the like comprising a vehicle bumper having an aperture therein, means positioning a license plate behind said aperture, and releasable means adjacent said plate and secured to a stud means extending from said bumper into and remotely operable from a compartment within said vehicle to prevent removal of said plate.

2. A vehicle license plate holder comprising a bumper having an upwardly extending wall provided with a first aperture therein, and a horizontally extending wall having a second aperture therein, means for mounting a license plate insertable through said second aperture behind said first aperture, and releasable means adjacent said plate and secured to a stud means extending from said bumper into and remotely operable from a compartment within said vehicle to prevent removal of said plate.

3. A license plate holder for a vehicle comprising, in combination, a bumper having a first aperture for display of a license plate, and having a second aperture for insertion and removal of said license plate, spring means to hold said license plate adjacent the first aperture, retractable blocking means to prevent removal of said license plate, and a stud having one end adjacent the bumper and attached to said blocking means for movement of said blocking means, and having the other end of said stud extending into and movably secured to a concealed portion of said vehicle.

4. A license plate holder for a vehicle comprising, in combination, a vehicle bumper having an aperture therein for display of a license plate, spring means secured to said bumper and engaging said plate for holding said license plate adjacent said aperture, and clamping means engageable with said plate and secured to a stud means extending from said bumper into and remotely operable from a compartment within said vehicle to positively clamp the license plate in place.

5. A license plate holder comprising a vehicle bumper having an upwardly extending wall provided with a first opening, and a horizontally extending wall provided with a further opening for insertion and removal of a license plate, a housing secured to said bumper behind said first opening, leaf springs secured to said housing and engageable with said license plate to hold the license plate adjacent said first opening, a bracket secured to said horizontally extending wall, a clamp slidably mounted on said bracket to a first position at which said clamp engages said plate and to a second position at which said clamp is removed from said plate, and means moving said clamp relative to said bracket comprising a stud having one end secured to said clamp and having its other end extending into a compartment within said vehicle and mounted for movement relative thereto whereby movement of said stud provides corresponding movement of said clamp from said second to said first position to lock said license plate against said bumper.

6. A license plate holder comprising, in combination, a vehicle bumper having a first aperture therein for display of a license plate, a second aperture for insertion and removal of said license plate, means for holding the license plate adjacent said first aperture, retractable cover means for said second aperture, and stud means secured to said cover means extending from said bumper into and remotely operable from a compartment within said vehicle to prevent removal of said license plate.

References Cited in the file of this patent

UNITED STATES PATENTS

| | | |
|---|---|---|
| 1,248,043 | Ware | Nov. 27, 1917 |
| 1,655,993 | Frasier | Jan. 10, 1928 |
| 1,887,727 | Adams | Nov. 15, 1932 |
| 2,098,156 | Nielsen | Nov. 2, 1937 |
| 2,128,679 | Kielian | Aug. 30, 1938 |
| 2,194,042 | Wyatt | Mar. 19, 1940 |
| 2,280,558 | Thompson | Apr. 21, 1942 |
| 2,349,703 | Carlin | May 23, 1944 |
| 2,454,722 | Slamka | Nov. 23, 1948 |
| 2,763,077 | Neely | Sept. 18, 1956 |
| 2,807,899 | Adams | Oct. 1, 1957 |